(12) United States Patent
Ghosh

(10) Patent No.: US 6,795,310 B2
(45) Date of Patent: Sep. 21, 2004

(54) ENHANCED SPACE UTILIZATION FOR ENCLOSURES ENCLOSING HEAT MANAGEMENT COMPONENTS

(75) Inventor: Prosenjit Ghosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 09/752,245

(22) Filed: Dec. 28, 2000

(65) Prior Publication Data

US 2002/0085350 A1 Jul. 4, 2002

(51) Int. Cl.[7] .................................................. G06F 1/16
(52) U.S. Cl. ...................................... 361/687; 361/688
(58) Field of Search ............................ 361/687–689, 361/697–702, 704, 707

(56) References Cited

U.S. PATENT DOCUMENTS

| | | | |
|---|---|---|---|
| 5,136,468 A | 8/1992 | Wong et al. | |
| 5,191,544 A | 3/1993 | Benck et al. | |
| 5,816,673 A | 10/1998 | Sauer et al. | |
| 5,867,369 A | 2/1999 | Antonuccio et al. | |
| 5,967,633 A | 10/1999 | Jung | |
| 6,029,742 A | 2/2000 | Burward-Hoy | |
| 6,058,011 A | 5/2000 | Hardt et al. | |
| 6,069,793 A * | 5/2000 | Maruyama et al. | 361/687 |
| 6,114,622 A | 9/2000 | Draeger | |
| 6,115,251 A | 9/2000 | Patel et al. | |
| 6,118,655 A * | 9/2000 | Mecredy, III et al. | 361/687 |
| 6,125,035 A | 9/2000 | Hood, III et al. | |
| 6,137,683 A | 10/2000 | Lee et al. | |
| 6,148,906 A * | 11/2000 | Li et al. | 165/104.33 |
| 6,215,657 B1 * | 4/2001 | Bhatia | 361/687 |
| 6,418,017 B1 * | 7/2002 | Patel et al. | 361/700 |

* cited by examiner

Primary Examiner—Darren Schuberg
Assistant Examiner—Yean-Hsi Chang
(74) Attorney, Agent, or Firm—Blakely, Sokoloff, Taylor & Zafman LLP

(57) ABSTRACT

An enclosure such as a notebook computer chassis in which the thermo-siphon devices are embedded in the skin of the enclosure is disclosed. The thermo-siphon devices include heat pipes. The thermo-siphon devices are use to absorb the heat dissipated by a heat source and dissipate it at a remote location.

14 Claims, 4 Drawing Sheets

ENHANCED SPACE UTILIZATION FOR ENCLOSURES ENCLOSING HEAT MANAGEMENT COMPONENTS

BACKGROUND OF THE INVENTION

In electronic as well as non-electronic devices, enclosures are commonly used to house device components. These enclosures perform several functions including providing structural support to the device components, preventing the enclosed components from overheating, and vibration dampening. The enclosures are also referred to as housings. One example of an enclosure for an electronic device is a computer chassis. Typically, a computer includes a chassis that is generally a metallic frame. The chassis typically houses circuit boards, power supplies and wiring. The chassis typically includes four sidewalls and top and bottom elements. The sidewalls and the top and bottom elements are also referred to as chassis walls. Generally, at least one of the chassis walls comprises a removable cover such that the chassis components are easily accessible for replacement and repair purposes. The chassis walls are typically thick and rugged such that they provide a robust structural support for the enclosed components. The chassis walls are collectively referred to as the chassis skin.

The skin often encloses device components that can malfunction and cause device failure when they overheat. Some device components dissipate heat during their operation. They are referred to as heat sources. An example of the heat source includes the integrated chips that comprise the circuit boards installed in the computer chassis. The heat generated by the heat sources can damage not only the heat sources themselves but also the other components enclosed by the skin. To avoid device failure, therefore, the heat in the interior of the enclosure must be effectively managed. A common heat management technique includes designing a well-ventilated enclosure such that the heat can dissipate to the exterior of the enclosure. Another technique includes fabricating the enclosure from materials with high thermal conductivity. Still another technique includes installing a cooling fan inside the enclosure. Yet another effective heat management technique includes using a thermo-siphon device to absorb the heat from the interior of the enclosure and transfer it to a heat sink. The heat sink can include the air to the exterior of the enclosure or a cooler portion of the chassis away from the heat source. A well-known thermo-siphon device is the heat pipe.

A disadvantage of installing thermo-siphon devices in the interior of the enclosure is that they require additional space and thus increase the size of the enclosure. In the industries such as the notebook computer industry, the consumers are ever demanding a smaller and lighter chassis. The thermo-siphon devices are effective heat management tools and it is desirable to use them. There is a need in the art, therefore, for an enclosure design that houses the thermo-siphon devices without increasing the enclosure size.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention discloses an enclosure in which the thermo-siphon devices are embedded in the skin of the enclosure. In the ensuing description, a computer chassis is disclosed by way of example. It will be evident, however, that the present invention can relate to any electronic or non-electronic device enclosure that houses thermo-siphon devices.

Figure 1:
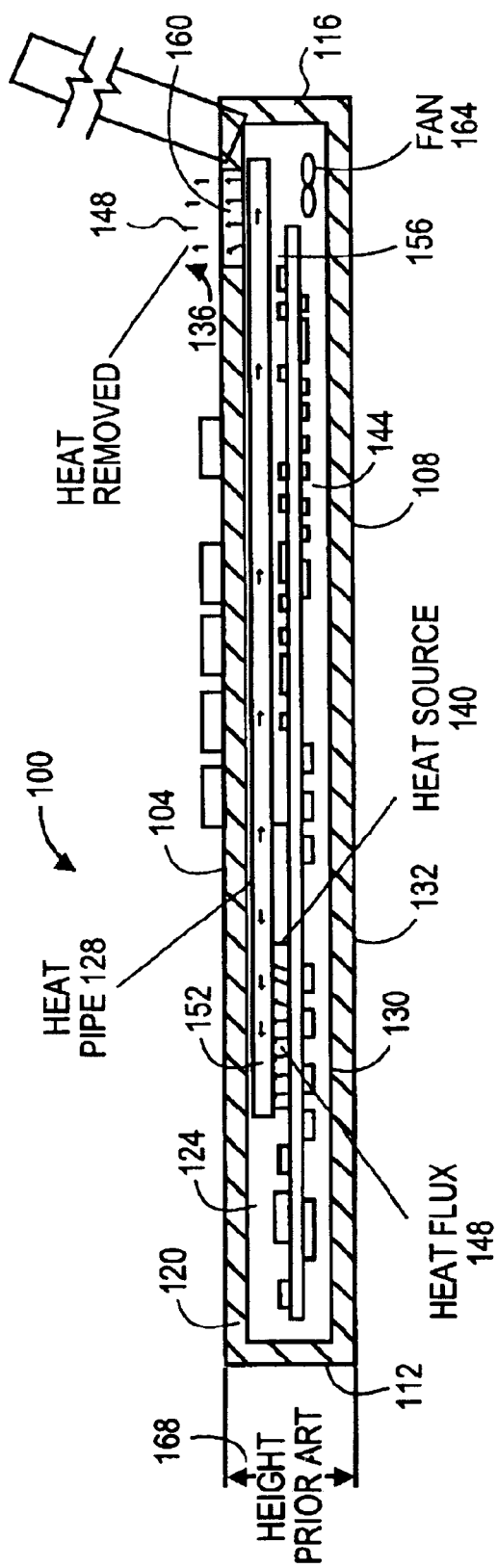
FIG. 1 illustrates a front cross sectional view of the computer chassis of the prior art.

FIG. 1 illustrates a front cross sectional view of one embodiment of the computer chassis of the prior art. A computer chassis 100 is shown having a top element 104, a bottom element 108, and sidewalls 112 and 116. The top and bottom elements 104 and 108, and the sidewalls 112 and 116 collectively form the skin 120. The interior 124 of the chassis 100 is defined as the space enclosed by the skin 120. The inner wall 130 of the skin is exposed to the interior 124 and the outer wall 132 is exposed to the exterior 136 of the chassis 100. The shortest distance between the inner wall 130 and the outer wall 132 constitutes the skin thickness. Typically, the space between the walls 130 and 132 is filled with a metallic material such that it provides for a robust skin 120 that can provide a strong structural support to the chassis 100. The skin can also be fabricated from non-metals that have low thermal conductivities.

The interior 124 of the chassis has a thermo-siphon device 128, for example, a heat pipe, and a heat source 140 installed therein. An example of the heat source 140 is an integrated circuit (IC) chip. The chip 140 is embedded on the circuit board 144 and faces the top element 104 such that the heat flux 148 dissipated by the chip 140 flows towards the top element 104. It is appreciated that FIG. 1 illustrates exemplary chassis geometry and other chassis 100 geometries are feasible. For example, chassis 100 geometries wherein the chip 140 is positioned such that it faces one of the sidewalls 112 or 116, or the bottom element 108, are contemplated. It is also contemplated that although the newly generated heat flux 148 will initially thrust towards the top element 104, the heat flux 148 can eventually spread in infinite direction.

The thermo-siphon device 128 serves to transport the heat away from the chip 140 such that the chip 140 and the other components of the circuit board do not overheat. In one embodiment, the thermo-siphon device 128 is a heat pipe. The heat pipes 128 are well known in the art as self-contained heat-transfer devices. In one embodiment, the heat pipes transport thermal energy by vaporizing a liquid inside one end near a heat source and re-condensing it at the other end. The heat pipes are depressurized and sealed. One advantage of the heat pipes is that they have low temperature drops across their lengths. The internal geometry of the heat pipe typically consists of a hollow tube, an annulus wicking structure, and a working fluid. The heat is conducted through the heat pipe walls by means of conduction heat transfer.

The vaporizing end 152 of the heat pipe 128 is positioned intelligently near the heat source 140 such that maximum amount of heat flux 140 is absorbed by the vaporizing end 152. The re-condensing end 156 releases the heat flux 148 absorbed by the vaporizing end 152. The re-condensing end 156 is intelligently positioned near the ventilation cavity 160 such that the heat flux 148 released by the re-condensing end 156 can be dissipated into the air to the exterior 136 of the chassis 100. The fan 164 facilitates the dissipation of the heat flux 148 to the exterior 136.

The heat pipe 128 is only one example of the thermo-siphon device 128. Another example of the thermo-siphon device 128 is a strip of a high efficiency conduit material. The thermo-siphon device 128 is typically fabricated from materials that have good thermal conductivity including metals such as copper and non-metals.

The shortest distance between the outer wall 132 of the top element 104 and the outer wall 132 of the bottom element 108 is referred to as the chassis height 168. It is evident from FIG. 1 that installing the thermo-siphon device in the interior 124 of the chassis 100 adds to the chassis height 168. This is a disadvantage of the computer chassis 100 of the prior art.

Figure 2:
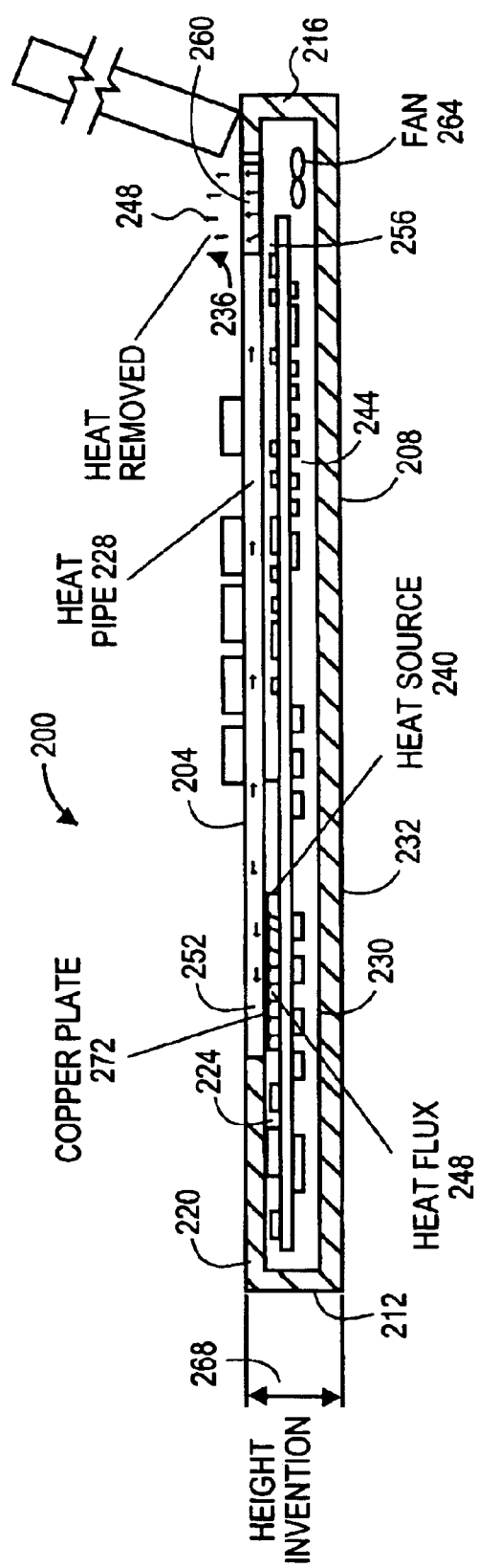
FIG. 2 illustrates a front cross sectional view of one embodiment of the computer chassis that comprises the thermo-siphon device embedded in the skin of the chassis.
Figure 3:
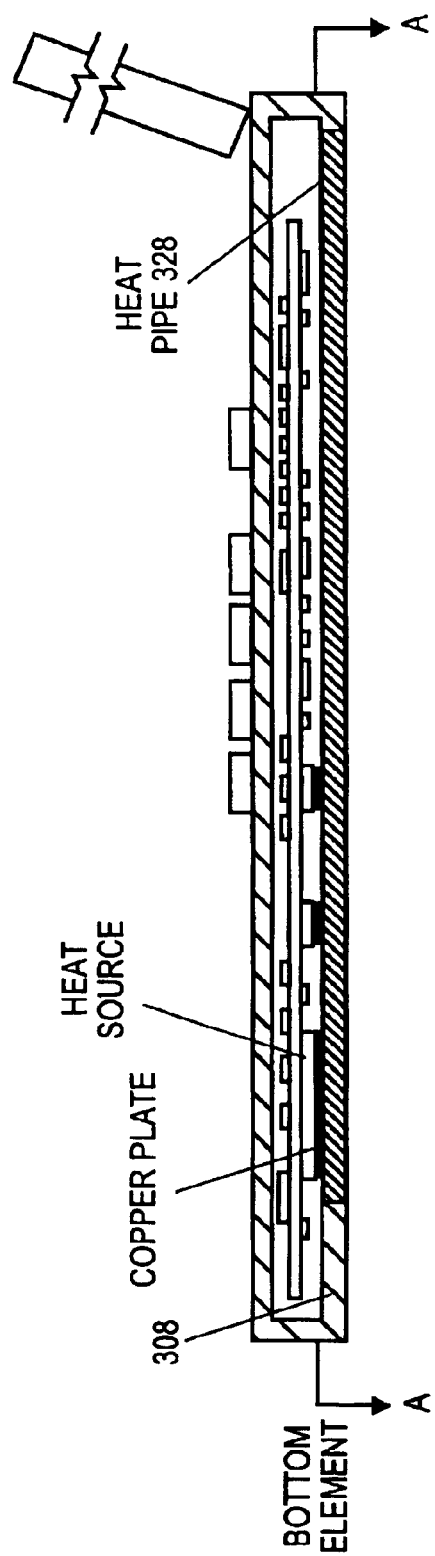
FIG. 3 illustrates a front cross sectional view of another embodiment of the computer chassis that comprises the thermo-siphon device embedded in the skin of the chassis.
Figure 4:
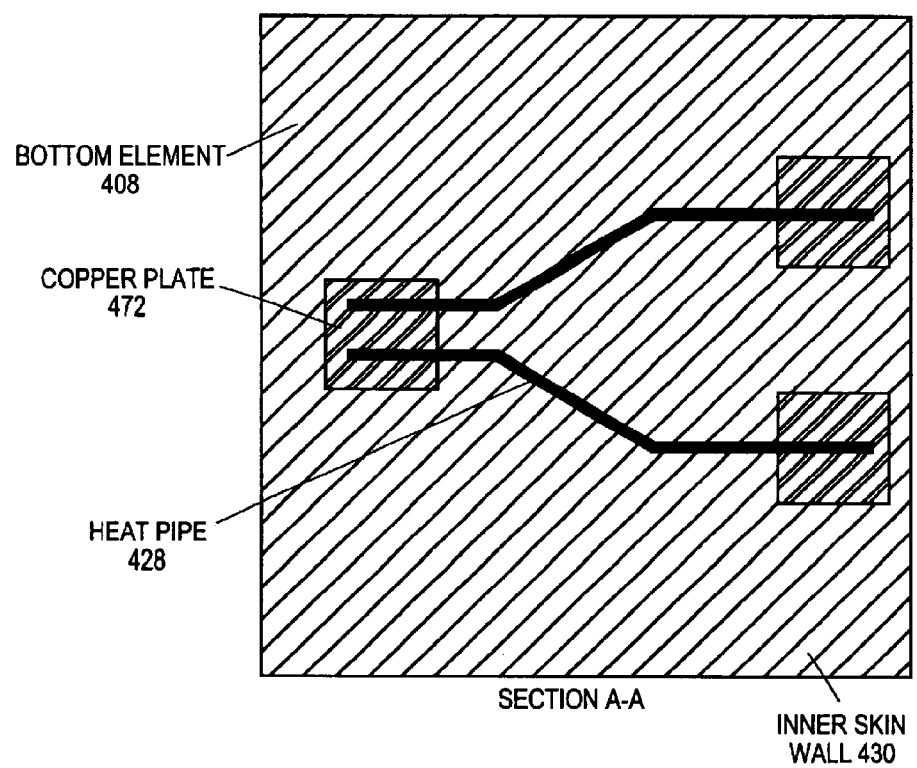
FIG. 4 illustrates a top cross sectional view of the computer chassis of FIG. 3.

FIG. 2 illustrates a front cross sectional view of one embodiment of the computer chassis that comprises the thermo-siphon device embedded in the skin of the chassis. The thermo-siphon device 228 is shown sandwiched between the inner wall 230 and the outer wall 232 of the skin 220. In one embodiment, the thermo-siphon device 228 is embedded in the top element 204. In another embodiment, as illustrated in FIG. 3, the thermo-siphon device 328 is embedded in the bottom element 308. It is contemplated that in other embodiments, the thermo-siphon device 228 can be embedded is the sidewalls 212 and 216. In one embodiment, the thermo-siphon device 228 is tubular in shape. In another embodiment, the thermo-siphon device 228 has a flattened geometry. In one embodiment, the thermo-siphon device 228 is a heat pipe. In another embodiment, the thermo-siphon device 228 is a strip of high efficiency conduit material. In one embodiment, the heat pipe 228 is a tubular heat pipe. In another embodiment, the heat pipe 228 is a flattened heat pipe. In one embodiment, the thermo-siphon device 228 has a linear geometry. In another embodiment, as illustrated in FIG. 4, the thermo-siphon device 228 has a curved geometry.

In one embodiment, the thermo-siphon device 228 is an integral part of the skin 120 wherein the thermo-siphon device 228 is embedded in the skin 220 during the fabrication process of the skin 220. Such an embodiment makes the function of heat removal an integral part of the skin 220. The prior art, as illustrated in FIG. 1, separates the enclosure function of the skin 220 from the heat removal function. The space occupied by the thermo-siphon device 228 is filled with skin material such as metallic material in the prior art. In one embodiment, a cavity of the size of the thermo-siphon device 228 is created in the skin 220 during the skin fabrication process such that the thermo-siphon device can be secured in the cavity. In one embodiment, the skin cavity is created through a material removal process. In another embodiment, the skin cavity is created during the injection molding operation to fabricate the skin 220.

In one embodiment, the thermo-siphon device 228 is not an integral part of the skin 220 and the thermo-siphon device 228 can be inserted and removed from the skin cavity by accessing the interior 224 of the chassis 200. In one embodiment, the top element 204 that contains the cavity is a removable cover such that the thermo-siphon device 228 can be inserted and removed from the cavity by removing the top element 204.

In one embodiment, the inner wall 230 of the skin 220 does not cover the vaporizing end 252 of the thermo-siphon device 228, thereby exposing the vaporizing end 240 to the interior 224 of the chassis 200. In one embodiment, neither skin wall 230 or 232 covers the re-condensing end 256, thereby exposing the re-condensing end 256 to the fan 264 and the ventilation cavity. It is contemplated that in one embodiment, the chassis 200 does not include a fan. In one embodiment, the inner wall 230 does not cover any part of thermo-siphon device 228, thereby exposing the full length of the thermo-siphon device 228 to the interior 224 of the chassis 200. The thermo-siphon device 228 can be secured into the cavity through various means such as, for example, support from the walls 230 and 232, thermal epoxy, and interference fit with the cavity walls.

In one embodiment, thermo-siphon device 228 extends through the skin cavity (not shown) in the sidewall 216 such that the re-condensing end 256 is positioned to the exterior 236 of the chassis 200. In one embodiment, the thermo-siphon device 228 can be manually inserted into and removed from the skin cavity through the sidewall cavity.

In one embodiment, a metallic plate 272 interfaces the heat source with the vaporizing end 252 of the thermo-siphon device 228. The metallic plate 272 increases the surface area from which the heat flux 248 can be absorbed by the vaporizing end 252. In one embodiment, the metallic plate 272 is a copper plate. In one embodiment, the copper plate 272 is attached to the vaporizing end 252 through means such as crimping, soldering and thermal epoxy. Intimate contact between the plate 272 and the vaporizing end 252 is desirable because the vaporization end's heat absorption efficiency is a function of the proximity between the heat source 240, the plate 272 and the vaporization end 252.

FIG. 4 illustrates a top cross sectional view of the computer chassis of FIG. 3. Two non-linear thermo-siphon devices 428 are shown embedded between the inner wall 430 and the outer wall 232 (hidden underneath the inner wall 430). Three metallic plates 472 are shown attached to the thermo-siphon devices 428. In one embodiment, the vaporizing ends 252 of the two thermo-siphon devices 428 are attached to the same metallic plate 472 to enhance the pace and quantity of the absorption of the heat flux 248 dissipated by the heat source 240. In another embodiment, the re-condensing ends of the two thermo-siphon devices 428 are attached to the same metallic plate 472 to enhance the pace and quantity of the dissipation of the heat flux 248 to the heat sink.

It is evident from the chassis heights 168 and 268 of FIGS. 1 & 2 respectively that embedding the thermo-siphon device 228 into the skin 220 of the chassis 200 instead of installing it in the interior 224 is advantageous because it reduces the additional space requirement to install the thermo-siphon device 228 in the interior 224. It is contemplated that the thermo-siphon device 228 can be embedded in a variety of enclosures that house the thermo-siphon device 228.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A device enclosure comprising:
    a chassis including a top wall and an opposing bottom wall; and
    a thermo-siphon device formed as an integral part of the top wall of the chassis, the thermo-siphon device including a vaporizing end coupled to a first metal plate, and a condensing end coupled to a second metal plate, the top wall partially encloses the thermo-siphon device.

2. The device enclosure of claim 1, wherein the device is an electronic device.

3. The device enclosure of claim 2, wherein the device enclosure is a computer chassis.

4. The device enclosure of claim 1, wherein the device is a non-electronic device.

5. The device enclosure of claim 1, wherein the top wall is fabricated from a metallic material.

6. The device enclosure of claim 1, wherein the thermo-siphon device is embedded in a cavity of the wall.

7. The device enclosure of claim 6, wherein the cavity is created during a fabrication process of the wall.

8. The device enclosure of claim 1, wherein a portion of the thermo-siphon device is exposed to an interior of the enclosure.

9. The device enclosure of claim 1, wherein a portion of the thermo-siphon device is exposed to a heat sink.

10. The device enclosure of claim 1, wherein the thermo-siphon device is secured to a wall cavity through the means selected from the group consisting of a support provided by cavity walls, a thermal epoxy, and an interference fit with the wall cavity.

11. A system comprising:

a chassis including a top wall and an opposing wall; and a thermo-siphon device formed as an integral part of the top wall of the chassis, the thermo-siphon device including a vaporizing end coupled to a first metal plate, and a condensing end coupled to a second metal plate, the top wall partially encloses the thermo-siphon device.

12. The system of claim 11, wherein the chassis is a computer chassis.

13. A computer chassis comprising:

a chassis including a top wall and an opposing wall; and a thermo-siphon device formed as an integral part of wall of the chassis, the thermo-siphon device including a vaporizing end coupled to a first metal plate, and a condensing end coupled to a second metal plate, the top wall partially encloses the thermo-siphon device.

14. The computer chassis of claim 13, wherein the computer chassis is a notebook computer base.

* * * * *